March 13, 1962   S. J. BARTOSH ET AL   3,025,336
ORGANIC PRIMARY CELLS
Filed Feb. 14, 1961
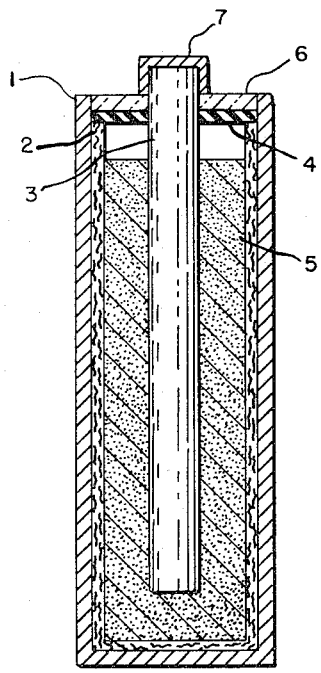
INVENTORS,
STEPHEN J. BARTOSH
JOSEPH C. PAWLAK.
BY Jack N. Linscott
ATTORNEY.

3,025,336
ORGANIC PRIMARY CELLS
Stephen J. Bartosh, Manasquan, and Joseph C. Pawlak, Red Bank, N.J., assignors to the United States of America as represented by the Secretary of the Army
Filed Feb. 14, 1961, Ser. No. 89,330
1 Claim. (Cl. 136—100)
(Granted under Title 35, U.S. Code (1952), sec. 266)

The invention described herein may be manufactured and used by or for the Government for governmental purposes, without the payment of any royalty thereon.

This invention relates to primary cells in general, and particularly to organic primary cells of high potential comprising a magnesium anode in combination with a cathodic material including meta dinitrobenzene, the cathodic material being mixed with a particular type carbon black in an electrolyte.

Primary cells are electrochemical devices from which stored chemical energy is converted to electrical energy by an electrochemical process. Generally, the term primary cells refers to a class of cells that do not have efficiently reversible chemical reactions. Once the chemical energy is converted to electrical energy, the cells are discarded. Primary cells that are manufactured to include a non-spillable electrolyte are referred to as dry cells. Primary cells that are assembled without one of the essential components, such as the electrolyte, but are adapted to supply electrical energy when the component is added just prior to use, are referred to as reserve cells.

A primary cell which is to be used as a portable power supply should have the following characteristics: A high watt-hour and a high ampere-hour capacity per unit of volume or weight; a high flat operating voltage over a wide range of current drains; a long life; and a low cost.

An object of this invention is to provide a primary cell which is comparatively inexpensive to manufacture, has a high watt-hour and a high ampere-hour capacity per unit of volume or weight, and has a relatively high flat operating voltage level over a wide range of current drains.

It has now been found that the above objective can be obtained with a primary cell comprising a magnesium anode in combination with a cathodic material including meta dinitrobenzene, the cathodic material being mixed with carbon black in an electrolyte, where the carbon black used is characterized by a fine particle size with a chain structure, a large surface covering area, and high electrolyte absorption.

By fine particle size, we refer to a carbon black having a particle size of about 500 angstroms as observed under the electron microscope. Similarly, a chain structure of ellipsoidal to round particles should be observed when viewing the carbon black under the electron microscope. The surface covering area of the carbon black must also be high, that is, on the order of 800 square meters per gram as determined by the nitrogen gas absorption method which is a standard method used for measuring the surface area of carbon blacks. By high electrolyte absorption is meant that when 5 grams of the carbon black is placed in a small flask and shaken with 0.5 ml. portions of standard aqueous electrolyte, at least 19 ml. of the electrolyte is required to agglomerate the carbon black into a single ball. A carbon black that meets the aforementioned requirements is known to the trade as Columbian #1100 Carbon Black, CL 20212.

The invention is described in greater detail by reference to the drawing in which a sectional, elevational view of a typical primary cell of the invention is shown.

Referring to the drawing, a cell according to the invention may be prepared as follows. A metallic anode 1 is provided in the form of a cup of the standard "A" size (American Standards Association, Bureau of Standards, Washington, D.C.). The anode 1 has the approximate composition 98.4% magnesium, 1.0% aluminum, 0.5% zinc, and 0.10% calcium. This alloy is sometimes designated AZ10A. The anode 1 is lined with a separator 2 comprising an absorbent kraft paper. The separator 2 keeps the anode 1 and a cathodic mix 5 apart while providing therebetween a low resistance path to the flow of ions during the electrochemical process.

A cathodic mix including the cathodic material and electrolyte is prepared from the following constituents:

*Cathodic Mix*

Cathodic Material:
    100 grams meta dinitrobenzene
    50 grams Columbian #1100 Carbon Black, CL 20212
    9 grams barium chromate Electrolyte: 250 ml. of a 2 normal magnesium perchlorate solution containing 1 gram of lithium chromate Approximately 7 grams of the mix is formed into a bobbin and inserted into the paper lined "A" size cup. A carbon rod 3 is inserted into the center of the cathodic mix to provide electrical connection thereto. The anode 1 is sealed with an insulation washer 4 mounted on the carbon rod and a layer of hard wax 6 on the washer. A metal contact cup of brass 7 on the carbon rod 3 serves as the contact. Bobbins are fabricated so that there is an air space between the washer 4 and the cathodic mix 5. An external load may then be applied by connecting the anode and cathode.

The above "A" size cell is found to deliver the following services under continuous discharge conditions:

| Resistance (External Circuit) | Cut-Off Voltage | Watt-Hour Per Pound | Hours of Service |
|---|---|---|---|
| 4 ohms | 1.00 | 28.7 | 3.2 |
|  | 0.90 | 44.7 | 5.5 |
| 16⅔ ohms | 1.00 | 62.6 | 26.3 |
|  | 0.90 | 75.0 | 33.4 |
| 50 ohms | 1.00 | 90.7 | 103.0 |
|  | 0.90 | 96.1 | 109.0 |

While there has been described what is at present considered a preferred embodiment of this invention, it will be obvious to those skilled in the art that various changes and modifications may be made therein without departing from the scope of the invention as hereinafter claimed.

What is claimed is:

A primary cell comprising a magnesium anode in combination with a cathodic material composed of meta dinitrobenzene and barium chromate, the cathodic material being mixed with carbon black in an electrolyte of magnesium perchlorate solution containing lithium chromate, and where said carbon black is characterized by a fine particle size of about 500 angstroms, a chain structure of ellipsoidal to round particles, a large surface covering area on the order of 800 square meters per gram, and a high electrolyte absorption such that 5 grams of the carbon black when shaken with standard aqueous electrolyte requires at least 19 milliliters of the electrolyte to agglomerate the carbon black into a single ball.

References Cited in the file of this patent
UNITED STATES PATENTS 2,855,452    Morehouse et al. _____ Oct. 7, 1958
2,976,342    Morehouse et al. _____ Mar. 21, 1961

FOREIGN PATENTS 391,468    France _____ Aug. 31, 1908